United States Patent [19]

Akasaki et al.

[11] Patent Number: 4,833,054
[45] Date of Patent: May 23, 1989

[54] ELECTROPHOTOGRAPHIC PHOTORECEPTOR HAVING A BISAZO COMPOUND

[75] Inventors: Yutaka Akasaki; Katsuhiro Sato; Akihiko Tokita; Hidemi Suto, all of Kanagawa, Japan

[73] Assignee: Fuji Xerox Co., Ltd., Tokyo, Japan

[21] Appl. No.: 114,980

[22] Filed: Oct. 30, 1987

Related U.S. Application Data

[63] Continuation-in-part of Ser. No. 80,357, Jul. 31, 1987, and a continuation-in-part of Ser. No. 81,509, Aug. 5, 1987.

[30] Foreign Application Priority Data

Oct. 30, 1986 [JP] Japan .................. 61-256867
Oct. 30, 1986 [JP] Japan .................. 61-256868

[51] Int. Cl.$^4$ .................................. G03G 5/06
[52] U.S. Cl. ........................ 430/59; 430/72; 430/76
[58] Field of Search ............ 430/59, 77, 73, 76

[56] References Cited

U.S. PATENT DOCUMENTS 4,299,897 11/1981 Stolka et al. .................. 430/59
4,537,847  8/1985 Takahashi et al. ............ 430/73
4,599,287  7/1986 Fujimaki et al. .............. 430/59

*Primary Examiner*—John L. Goodrow
*Attorney, Agent, or Firm*—Sughrue, Mion, Zinn, Macpeak & Seas

[57] ABSTRACT

An electrophotographic photoreceptor comprising an electrically conductive support having provided thereon a photosensitive layer composed of a charge generating layer and a charge transport layer, wherein said charge generating layer contains a bisazo compound represented by formula (I)

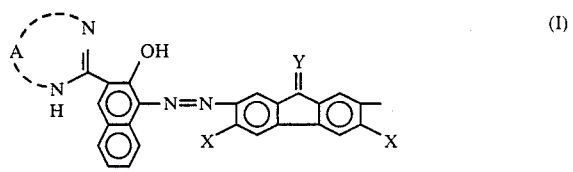

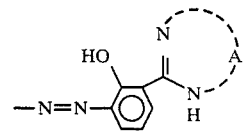

wherein X, Y, and A are defined in the specification, and said charge transport layer contains a benzidine compound represented by formula (II)

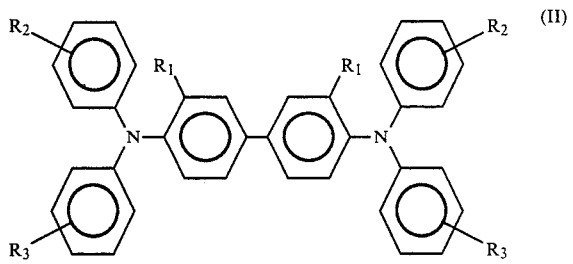

wherein $R_1$, $R_2$, and $R_3$ are as defined in the specification. The photoreceptor exhibits high photoresponse performance even in a weak electric field and exhibits high sensitivity in a visible light region.

9 Claims, No Drawings

ELECTROPHOTOGRAPHIC PHOTORECEPTOR HAVING A BISAZO COMPOUND

CROSS-REFERENCE TO RELATED APPLICATIONS

This is a continuation-in-part application of earlier applications Ser. No. 80,357 filed on July 31, 1987, now allowed and Ser. No. 81,509 filed on August 5, 1987, now allowed.

FIELD OF THE INVENTION

This invention relates to an electrophotographic photoreceptor, and more particularly to an electrophotographic photoreceptor using organic materials.

BACKGROUND OF THE INVENTION

An electrophotographic photoreceptor forms an electrostatic latent image upon charging followed by imagewise exposure to light. The electrostatic latent image is visualized by a toner, transferred to a transfer sheet, e.g., paper, and fixed thereon to make a copy.

Various materials have hitherto been proposed for the photoreceptor, including inorganic materials, such as selenium, zinc oxide, and cadmium sulfide; and organic materials. Among the currently employed electrophotographic photoreceptors using organic materials, i.e., organic photoreceptors, those of separate function type which comprise a combination of a material having excellent capability of generating charges and a material having excellent capability of transporting charges became more popular than those composed of a single material. The charge generating material to be used in the organic photoreceptors of separate function type includes bisazo pigments, phthalocyanine pigments, benzopyrylium dyes, perylene pigments, etc., and the charge transporting material to be used includes pyrazolines, pyrazones, polyvinylcarbazoles, etc. Satisfactory performance as photoreceptor cannot be attained merely by combining these charge generating materials and charge transporting materials at random, and a choice of materials should be made considering various electrophotographic characteristics, such as charge injection properties.

A number of proposals for the organic photoreceptors of separate function type have been made. For example, Japanese Patent Application (OPI) No. 105536/74 discloses an organic photoreceptor employing a combination of a squarylium pigment as a charge generating material and a triarylpyrazoline compound as a charge transporting material. (The term "OPI" as used herein means an "unexamined published application".)

However, the conventionally proposed organic photoreceptors have some disadvantages leaving room for improvement. That is, the conventional ones do not fully satisfy the performance requirements demanded for electrophotographic photoreceptors including charging characteristics, such as charge retention, dark decay, and residual potential, and photosensitive characteristics, such as sensitivity. Particularly when compared with selenium type photoreceptors, the organic photoreceptors are inferior in these characteristics, and the application of the organic photoreceptors is limited mainly to slow copying machines.

SUMMARY OF THE INVENTION

One object of this invention is to provide an organic electrophotographic photoreceptor having excellent charging characteristics and photosensitivity characteristics, and particularly sensitivity.

As a result of extensive investigations, the inventors have found that the above object of this invention can be accomplished by an electrophotographic photoreceptor comprising an electrically conductive support having provided thereon a photosensitive layer composed of (i) a charge generating layer containing a bisazo compound represented by formula (I)

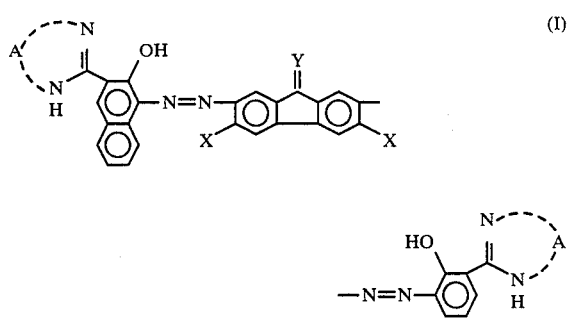

wherein X represents a hydrogen atom, a halogen atom or a nitro group, Y represents

or =O, and A represents a divalent aromatic hydrocarbon group or a divalent heterocyclic group containing at least one nitrogen atom; and (ii) a charge transport layer containing a benzidine compound represented by formula (II)

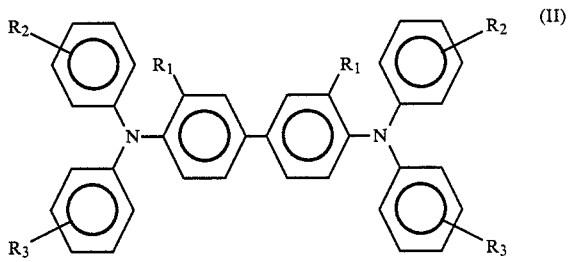

wherein $R_1$ represents an alkyl group or an alkoxy group, and $R_2$ and $R_3$ each represents a hydrogen atom, an alkyl group, an alkoxy group, a halogen atom, an alkoxycarbonyl group or a substituted amino group.

DETAILED DESCRIPTION OF THE INVENTION

The laminating order of the charge generating layer and the charge transport layer in the photosensitive layer is arbitrary. The photoreceptor may further comprised a protective layer provided on the photosensitive layer or an intermediate layer provided between the photosensitive layer and the conductive support.

In formula (I), the halogen atom for X includes a fluorine atom, a chlorine atom, a bromine atom and an iodine atom, with a chlorine atom being preferred.

The divalent aromatic hydrocarbon group represented by A preferably has from 6 to 14 carbon atoms and includes a divalent monocyclic aromatic hydrocarbon group such as an o-phenylene group, and a divalent condensed polycyclic aromatic hydrocarbon group such as an o-naphthylene group, a perinaphthaliene group, a 1,2-anthraquinonyl group, and a 9,10-phenanthrylene group, etc.

The divalent nitrogen-containing heterocyclic group represented by A preferably has from 4 to 12 carbon atoms and 1 or 2 nitrogen atoms and includes a 3,4-pyrazole-diyl group, a 2,3-pyridine-diyl group, a 3,4-pyridine-diyl group, a 4,5-pyridine-diyl group, a 5,6-benzimidazole-diyl group, a 6,7-quinoline-diyl group, etc.

These divalent aromatic or heterocyclic groups may have substituents, such as an alkyl group having from 1 to 18 carbon atoms, an alkoxy group having from 1 to 4 carbon atoms, an alkoxycarbonyl group having from 1 to 4 carbon atoms, a carboxyl group, a hydroxyl group, a nitro group, a cyano group, a halogen atom, a trifluoromethyl group, a carbamoyl group preferably having from 1 to 6 carbon atoms (e.g., a carbamoyl group, an N-methylcarbamoyl, an N-ethylcarbamoyl group, etc.), a sulfamoyl group preferably having from 1 to 6 carbon atoms, and a phenoxy group.

Taking sensitivity and durability into consideration, A preferably represents an o-phenylene group, an o-naphthylene group, a perinaphthylene group, a 2,3-pyridine-diyl group, a 3,4-pyridine-diyl group, a 4,5-pyridine-diyl group or a 9,10-phenanthrylene group, with a substituent being preferably selected from an alkyl group, an alkoxy group, a carboxyl group, a hydroxyl group, a nitro group, and a halogen atom.

In formula (II), $R_1$ represents an alkyl group having preferably from 1 to 5 carbon atoms and more preferably from 1 to 2 carbon atoms, or an alkoxy group having preferably from 1 to 5 carbon atoms and more preferably from 1 to 3 carbon atoms (e.g., a methoxy group, an ethoxy group, a propoxy group, etc.), and $R_2$ and $R_3$ each represents a hydrogen atom, an alkyl group having preferably from 1 to 10 carbon atoms and more preferably from 1 to 4 carbon atoms, an alkoxy group having preferably from 1 to 10 carbon atoms and more preferably from 1 to 4 carbon atoms, a halogen atom, e.g., Cl, Br, etc., an alkoxycarbonyl group having preferably from 2 to 5 carbon atoms and more preferably from 2 to 3 carbon atoms, or a substituted amino group such as those substituted with an alkyl group preferably having 1 or 2 carbon atoms, e.g., a dimethylamino group, a diethylamino group, etc.

Specific examples of the bisazo compound represented by formula (I) to be incorporated in the charge generating layer are shown below.

| Compound No. | X | Y | A |
|---|---|---|---|
| I-1 | H | =C(CN)(CN) | 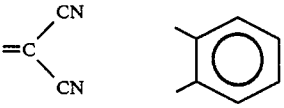 |
| I-2 | " | " | 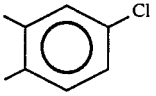 |
| I-3 | " | " | 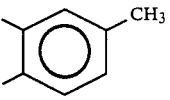 |
| I-4 | " | " | 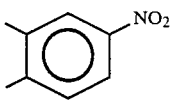 |
| I-5 | " | " | 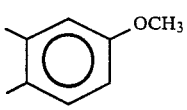 |
| I-6 | " | " | 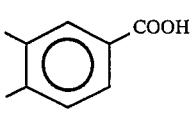 |
| I-7 | " | " | 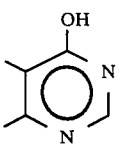 |
| I-8 | " | " | 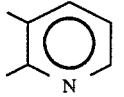 |
| I-9 | " | " | 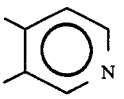 |
| I-10 | " | " | 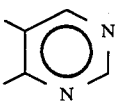 |
| I-11 | " | " | 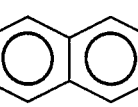 |
| I-12 | H | =C(CN)(CN) | 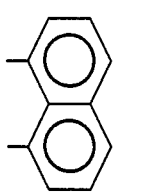 |

-continued
| Compound No. | X | Y | A |
|---|---|---|---|
| I-13 | " | " | 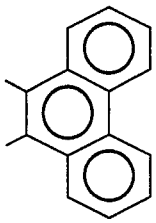 |
| I-14 | Cl | " | 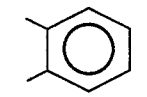 |
| I-15 | " | " | 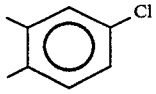 |
| I-16 | " | " | 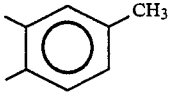 |
| I-17 | " | " | 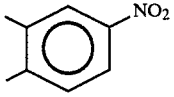 |
| I-18 | " | " | 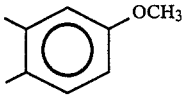 |
| I-19 | " | " | 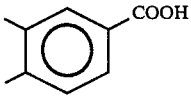 |
| I-20 | " | " | 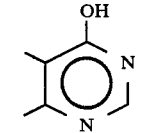 |
| I-21 | " | " | 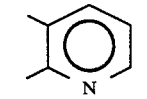 |
| I-22 | " | " | 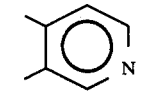 |
| I-23 | Cl | =C(CN)(CN) | 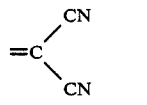 |
| I-24 | " | " | 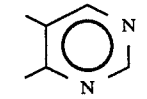 |
-continued
| Compound No. | X | Y | A |
|---|---|---|---|
| I-25 | " | " | 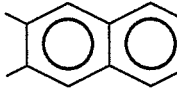 |
| I-26 | " | " | 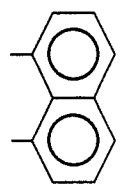 |
| I-27 | NO$_2$ | " | 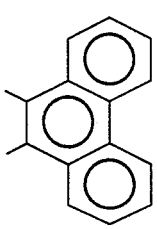 |
| I-28 | " | " | 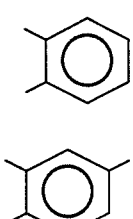 |
| I-29 | " | " | 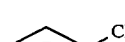 |
| I-30 | " | " | 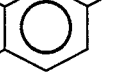 |
| I-31 | " | " | 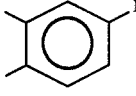 |
| I-32 | " | " | 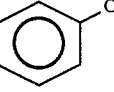 |
| I-33 | " | " | 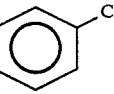 |
| I-34 | NO$_2$ | =C(CN)(CN) | 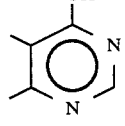 |
| I-35 | " | " | 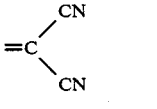 |

| Compound No. | X | Y | A |
|---|---|---|---|
| I-36 | " | " | 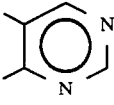 |
| I-37 | " | " | 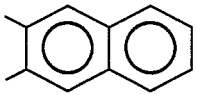 |
| I-38 | " | " | 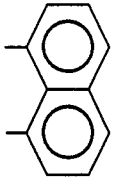 |
| I-39 | " | " | 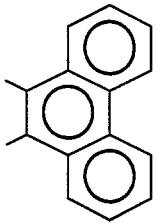 |
| I-40 | Br | " | 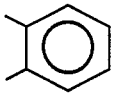 |
| I-41 | H | =O | 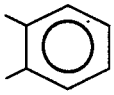 |
| I-42 | " | " | 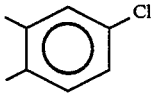 |
| I-43 | " | " | 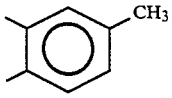 |
| I-44 | " | " | 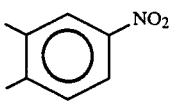 |
| I-45 | H | =O | 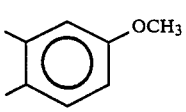 |
| I-46 | " | " | 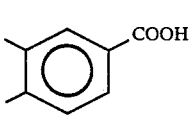 |
| I-47 | " | " | 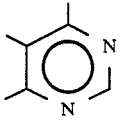 |
| I-48 | " | " | 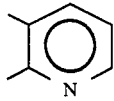 |
| I-49 | " | " | 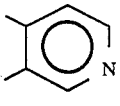 |
| I-50 | " | " | 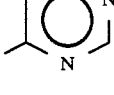 |
| I-51 | " | " | 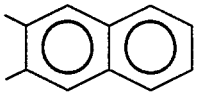 |
| I-52 | " | " | 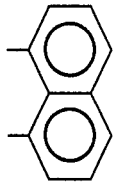 |
| I-53 | " | " | 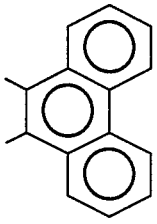 |
| I-54 | Cl | " | 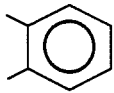 |
| I-55 | " | " | 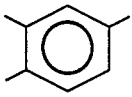 |
| I-56 | Cl | =O | 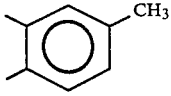 |
| I-57 | " | " | 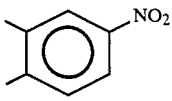 |

-continued
| Compound No. | X | Y | A |
|---|---|---|---|
| I-58 | " | " | 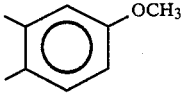 |
| I-59 | " | " | 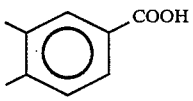 |
| I-60 | " | " | 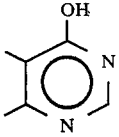 |
| I-61 | " | " | 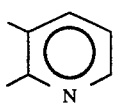 |
| I-62 | " | " | 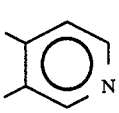 |
| I-63 | " | " | 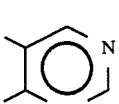 |
| I-64 | " | " | 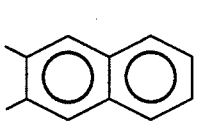 |
| I-65 | " | " | 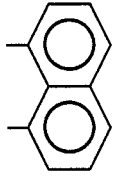 |
| I-66 | " | " | 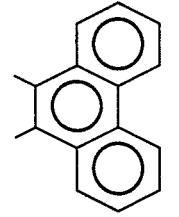 |
| I-67 | NO$_2$ | =O | 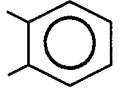 |
| I-68 | " | " | 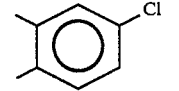 |
-continued
| Compound No. | X | Y | A |
|---|---|---|---|
| I-69 | " | " | 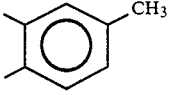 |
| I-70 | " | " | 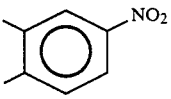 |
| I-71 | " | " | 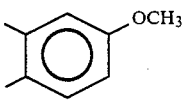 |
| I-72 | " | " | 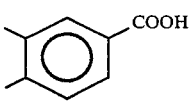 |
| I-73 | " | " | 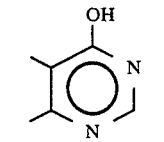 |
| I-74 | " | " | 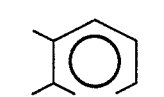 |
| I-75 | " | " | 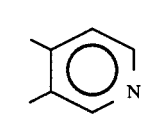 |
| I-76 | " | " | 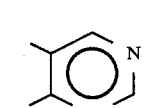 |
| I-77 | " | " | 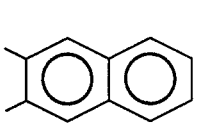 |
| I-78 | NO$_2$ | =O | 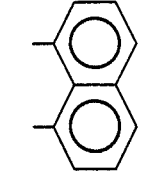 |
| I-79 | " | " | 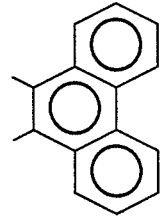 |

-continued

| Compound No. | X | Y | A |
|---|---|---|---|
| I-80 | Br | " | 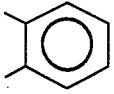 |

The bisazo compound of formula (I) can be synthesized by subjecting a diamine represented by formula (III)

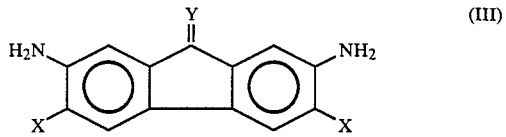

wherein X and Y and are defined above, to diazotation to convert it into a tetrazonium salt which may be isolated in the form of a borofluoride or a zinc chloride double salt, and then coupling it with a coupling component represented by formula (IV)

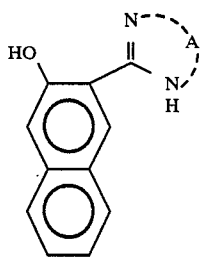

wherein A is as defined above. The diazotation can be performed, for example, by adding sodium nitrite in an inorganic acid (e.g., hydrochloric acid, sulfuric acid, etc.) containing the diamine at a temperature of from about −10° to 25° C. This reaction time is generally from 3 minutes to 3 hours. Further, the coupling reaction can be performed in a conventional manner, for example, by dissolving the tetrazonium salt and the compound of formula (IV) in an organic solvent (e.g., N,N-dimethylformamide, dimethyl sulfoxide, etc.) and adding dropwise thereto an alkaline aqueous solution (e.g., a sodium acetate aqueous solution) at a temperature of from −10° to 40° C.

The charge generating layer may be composed of the bisazo compound of formula (I) solely or in combination with a binder. In the latter case, the content of the bisazo compound in the charge generating layer generally ranges from 10 to 90% by weight, and preferably from 50 to 80% by weight.

The binder resin which can be used includes polystyrene, silicone resins, polycarbonate, acrylic resins, methacrylic resins, polyester, vinyl polymers (e.g., polyvinyl butyral, etc.), cellulose resins (e.g., cellulose esters, cellulose ethers, etc.), alkyd resins, and the like.

The charge generating layer has, in general, a thickness of from 0.05 to 3 μm, and preferably from 0.1 to 1 μm.

The charge generating layer can be formed in a well-known manner. In the case of using no binder resin, the charge generating layer can be formed by solvent coating or vacuum evaporation of the bisazo compound of formula (I). When a binder resin in used in the formation, the bisazo compound is pulverized by means of a known grinder, e.g., Spex Mill (trade name), a ball mill, Red Devil (trade name), etc., and then dispersed in a binder resin as fine particles preferably having a particle size of 3 μm or less and more preferably 0.3 μm or less.

The binder having dispersed therein the bisazo compound is coated on a charge transport layer or an electrically conductive support. A satisfactory charge generating layer can be obtained by any coating methods, such as dip coating, spray coating, bar coating, applicator coating, etc.

On the other hand, specific examples of the benzidine compound represented by formula (II) which can be incorporated in the charge transport layer are shown below. In the following formulae, Me represents a methyl group; Et represents an ethyl group; Pr represents a propyl group; and Bu represents a butyl group.

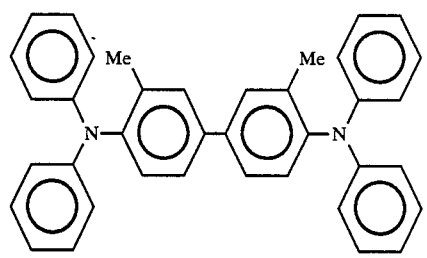

II-1

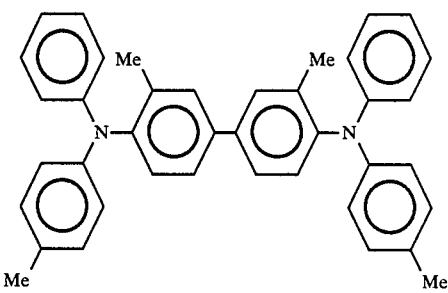

II-2

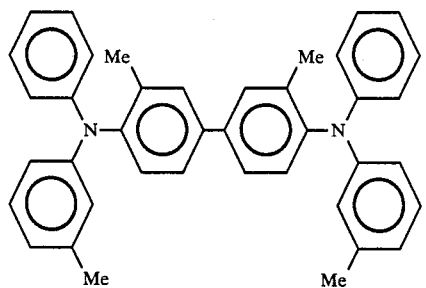

II-3

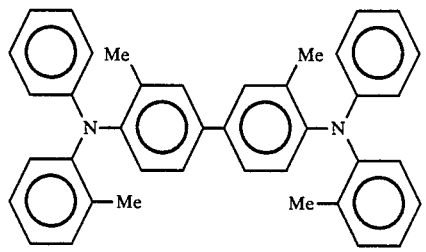

II-4

-continued
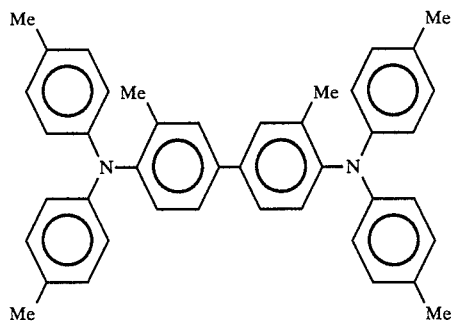
II-5
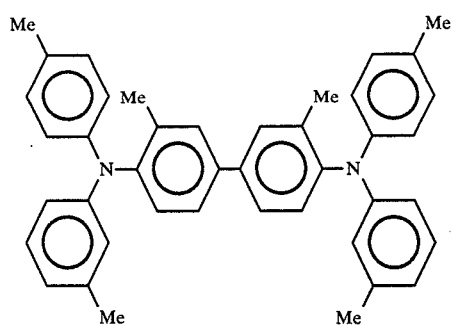
II-6
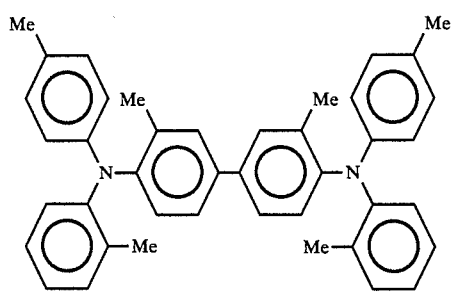
II-7
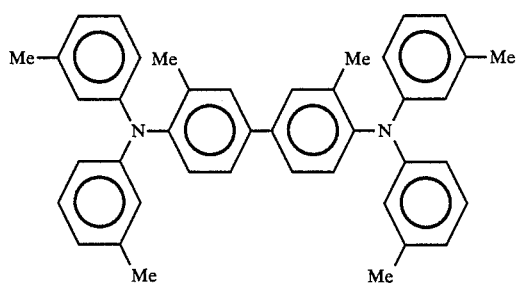
II-8
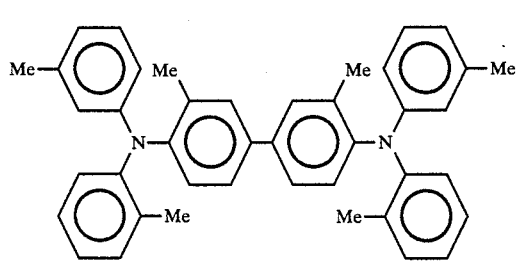
II-9
-continued
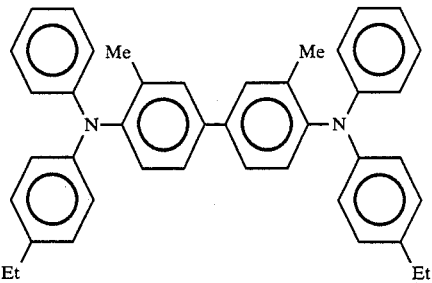
II-10
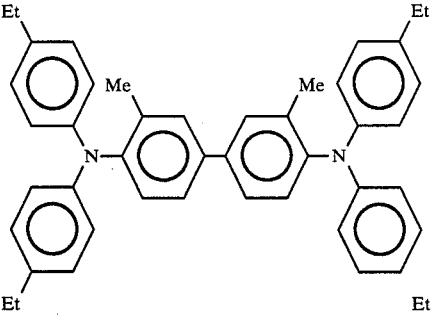
II-11
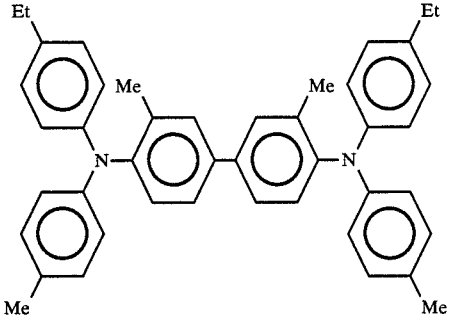
II-12
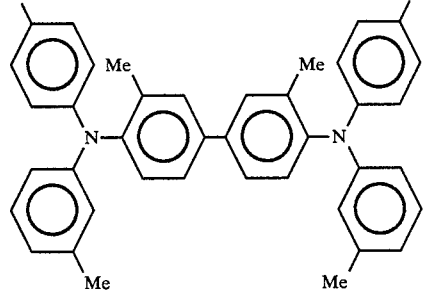
II-13
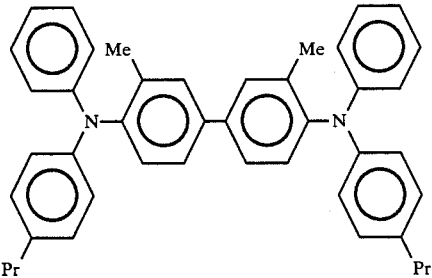
II-14

-continued
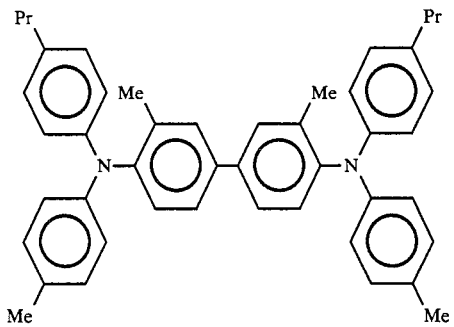
II-15
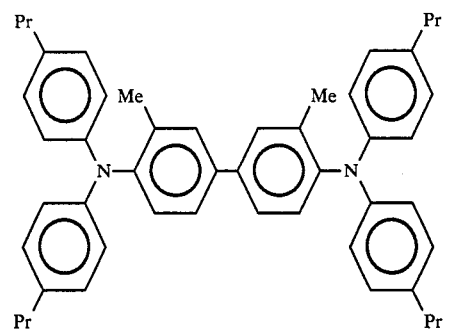
II-16
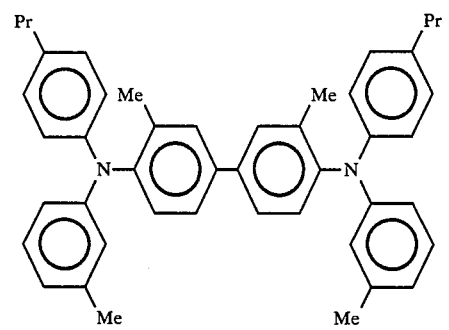
II-17
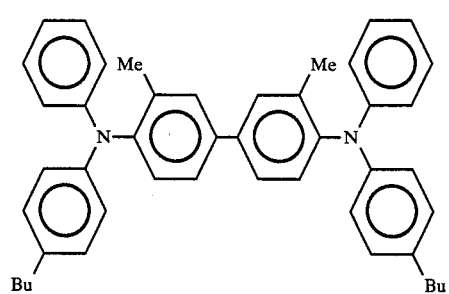
II-18
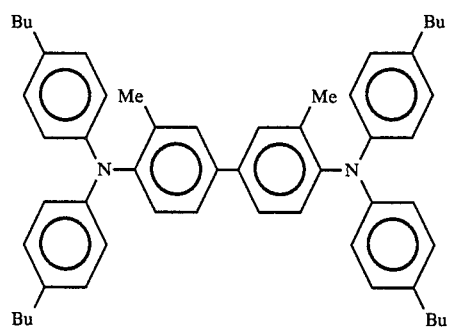
II-19
-continued
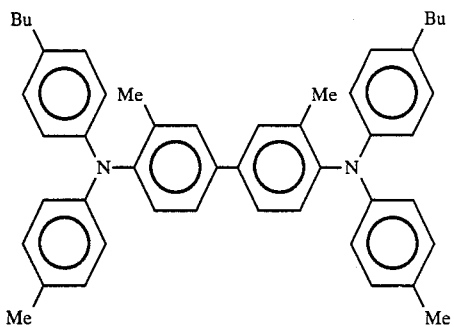
II-20
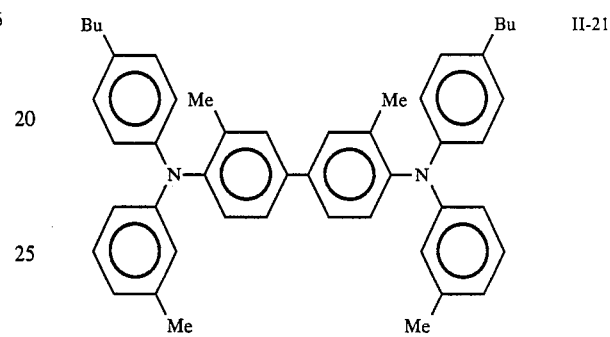
II-21
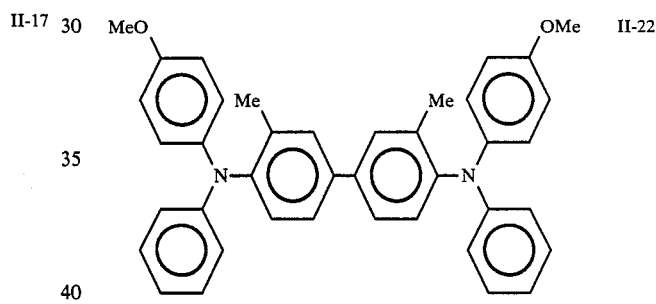
II-22
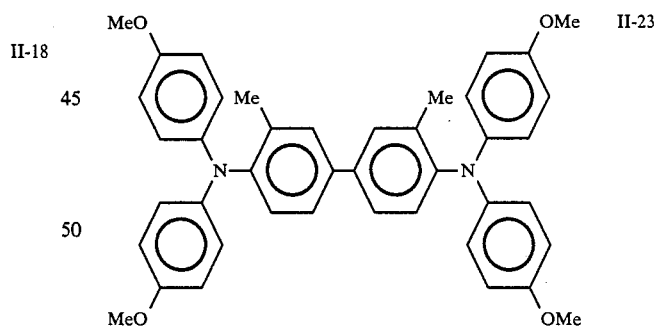
II-23
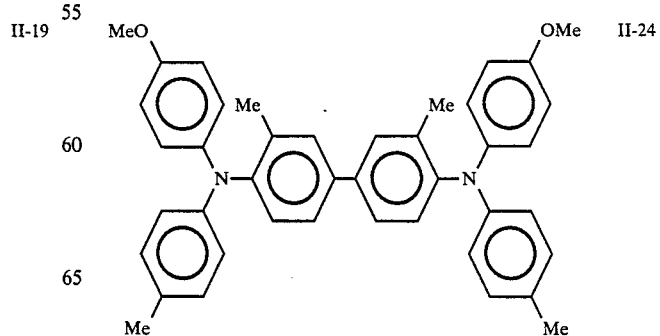
II-24

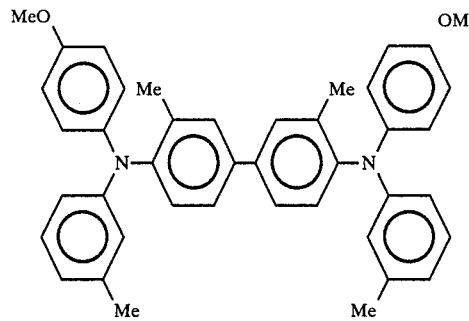
II-25
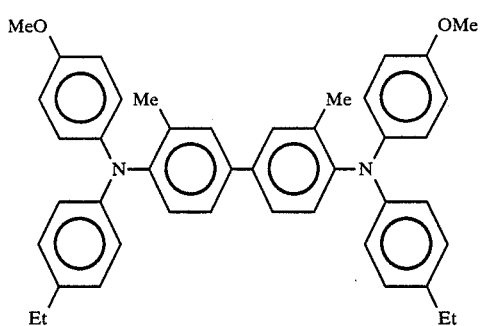
II-26
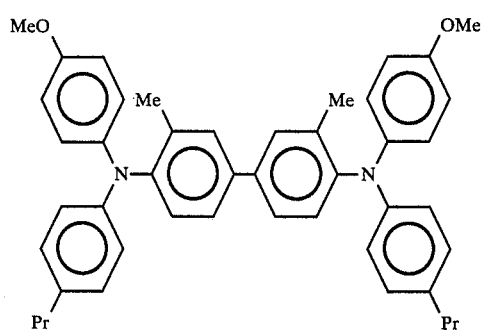
II-27
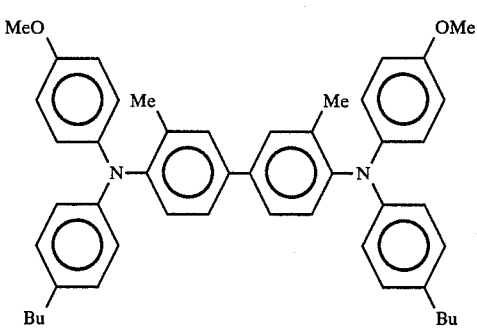
II-28
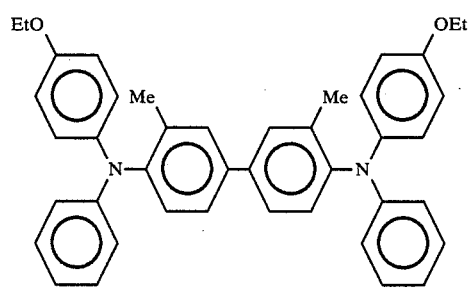
II-29
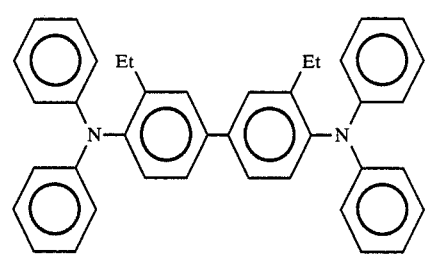
II-30
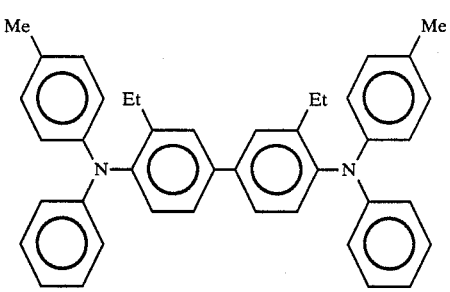
II-31
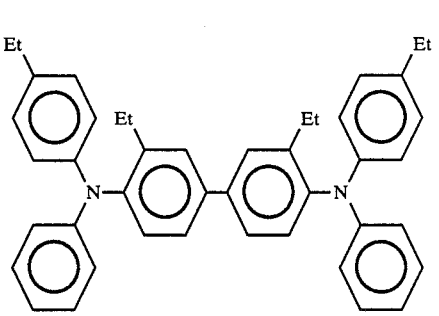
II-32
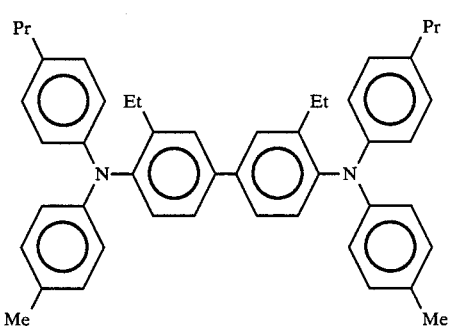
II-33
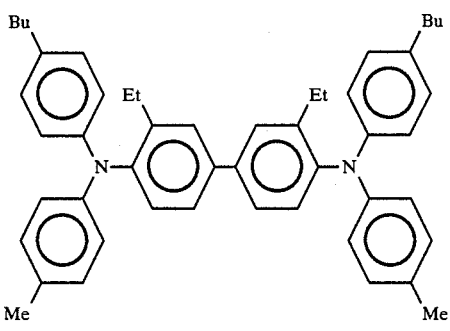
II-34

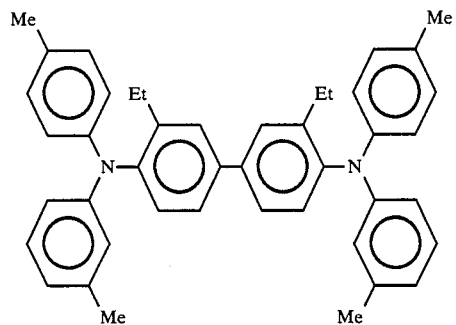
II-35
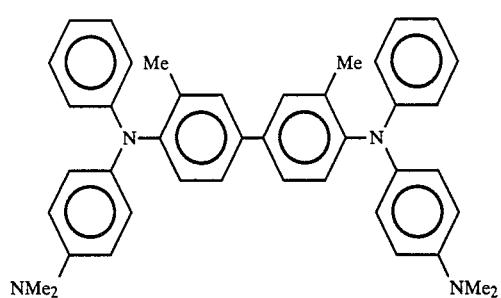
II-36
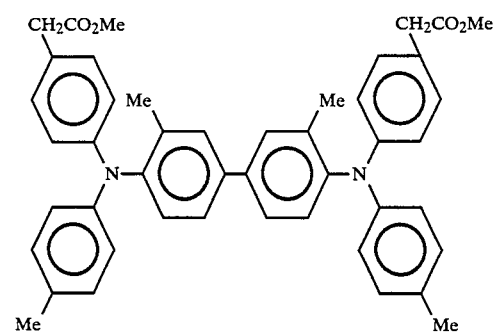
II-37
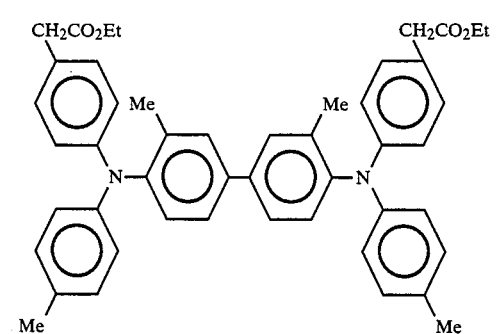
II-38
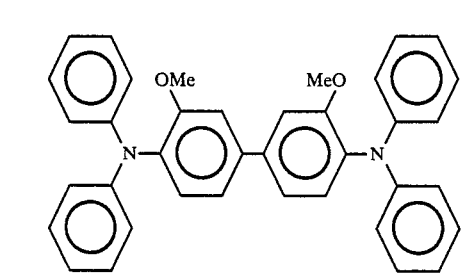
II-39
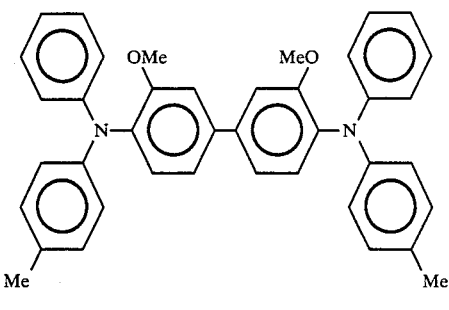
II-40
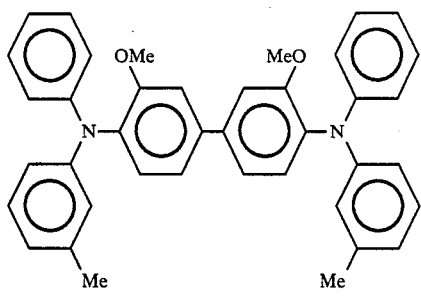
II-41
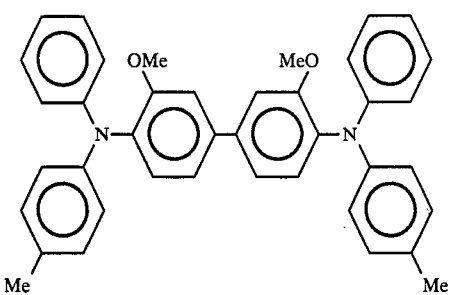
II-42
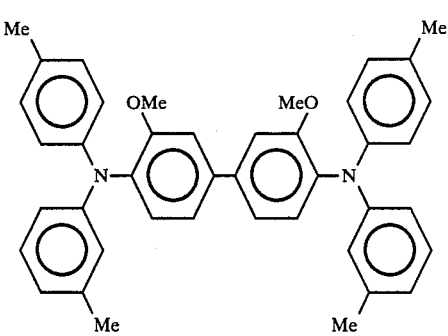
II-43
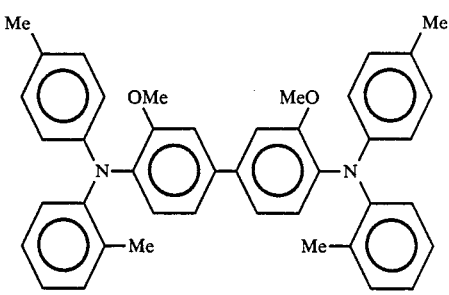
II-44

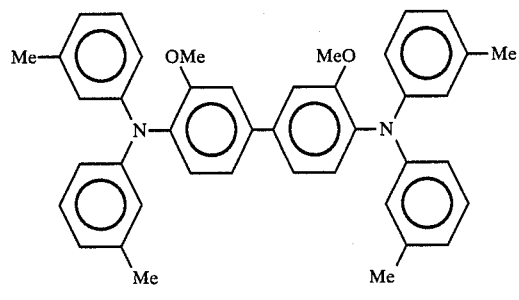 II-45
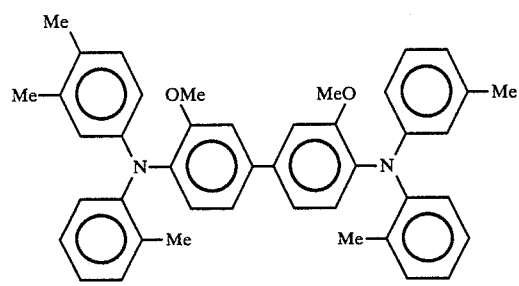 II-46
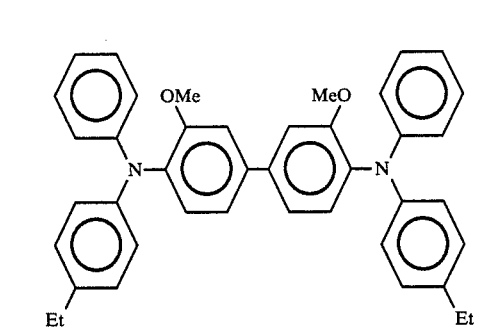 II-47
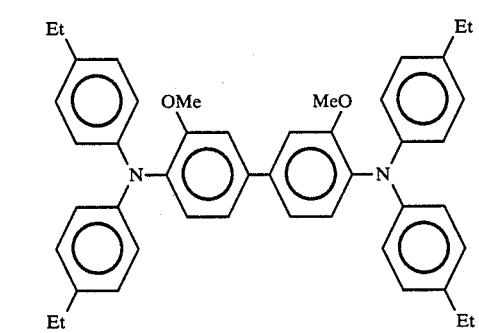 II-48
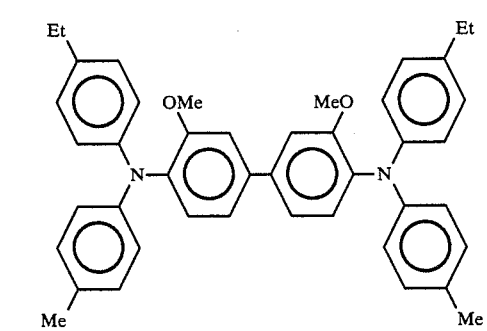 II-49
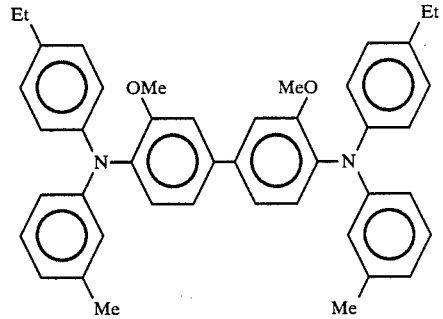 II-50
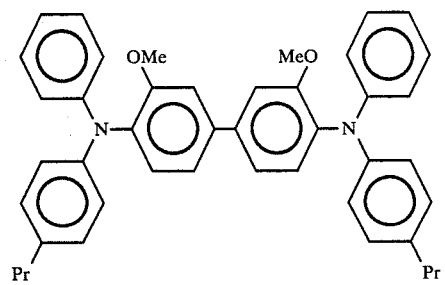 II-51
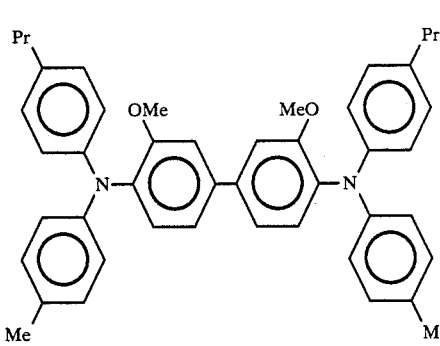 II-52
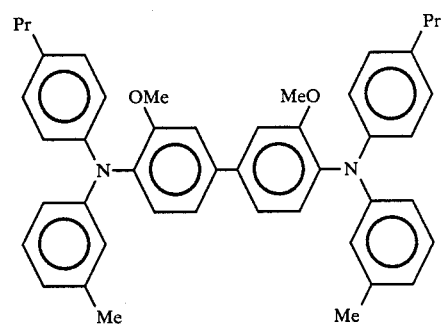 II-53
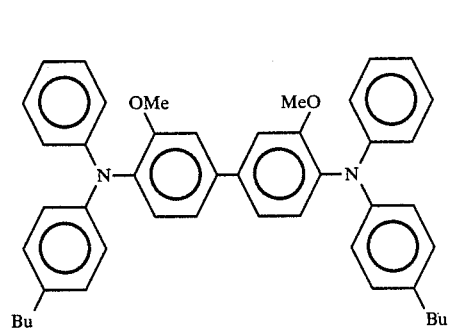 II-54

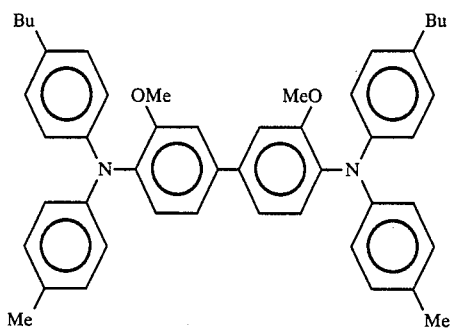 II-55
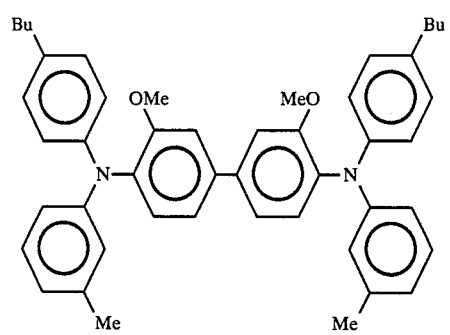 II-56
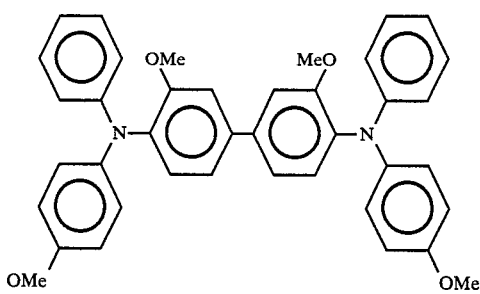 II-57
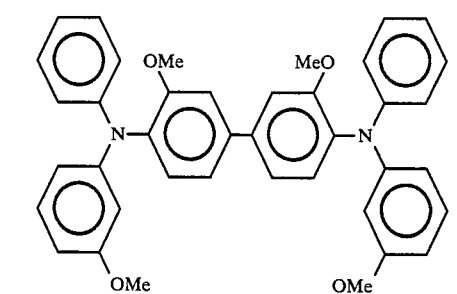 II-58
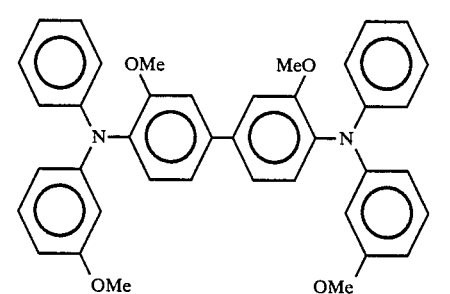 II-59
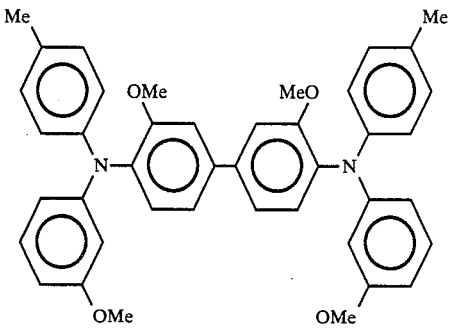 II-60
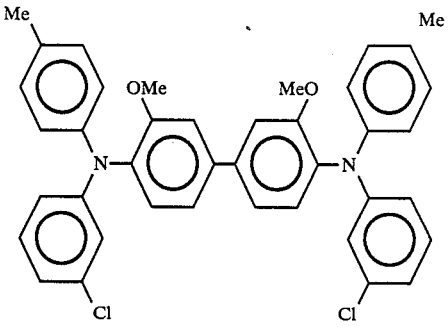 II-61
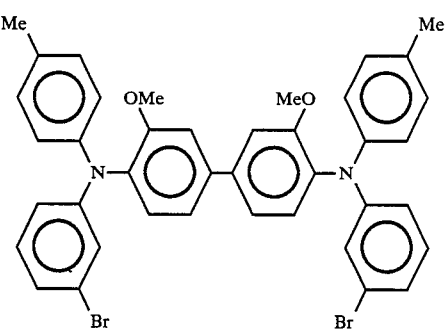 II-62
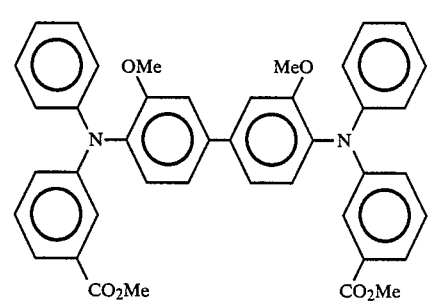 II-63
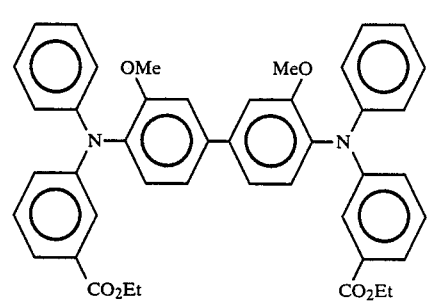 II-64

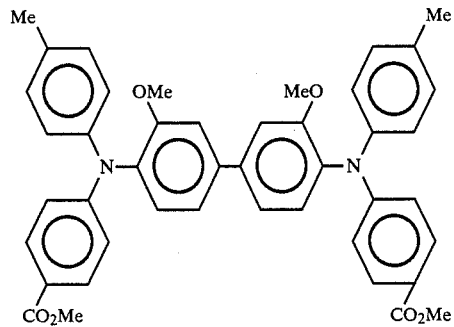

II-65

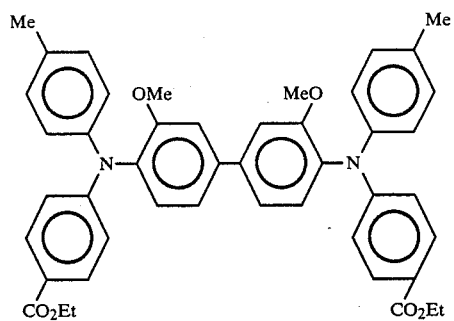

II-66

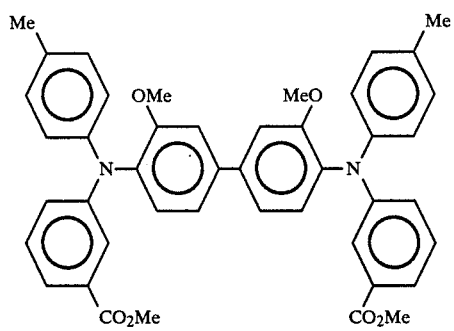

II-67

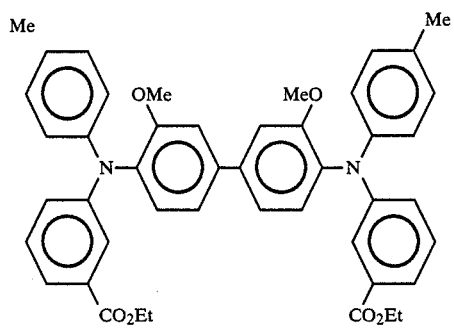

II-68

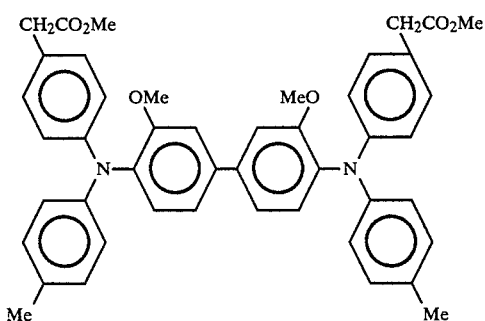

II-69

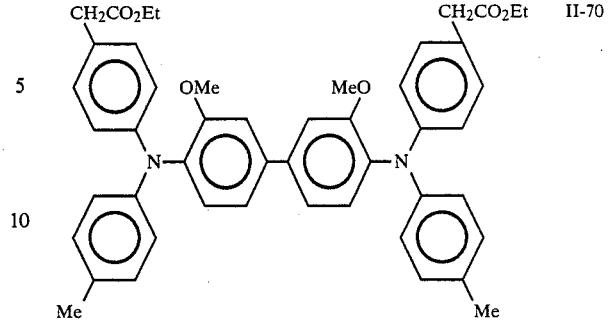

II-70

The benzidine compound represented by formula (II) can be prepared by reacting a halogenated benzene derivative represented by formula (VI)

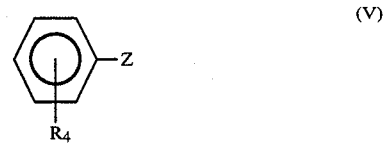

(V)

wherein $R_4$ represents a group as defined for $R_2$ and $R_3$ above and Z represents an iodine atom or a bromine atom, with a benzidine derivative represented by formula (VI)

$$H_2N-\underset{R_1}{\underset{|}{\bigcirc}}-\underset{R_1}{\underset{|}{\bigcirc}}-NH_2 \quad (VI)$$

wherein $R_1$ is as defined above, in the presence of a copper catalyst and an alkali.

The starting halogenated benzene derivatives of formula (V) are easily available and preferably include those wherein Z is an iodine atom, such as 2-, 3- or 4-iodotoluene. By using the halogenated benzene derivatives having different groups for $R_4$, the compound of formula (II) having different groups for $R_2$ and $R_3$ can be obtained.

The starting benzidine derivatives of formula (VI) are also easily available and include 3,3'-dimethylbenzidine, etc.

The condensation reaction between the compound of formula (V) and the compound of formula (VI) can be carried out in the presence of a copper catalyst and an alkali, with or without a reaction solvent, under heating.

The reaction solvent, if used, preferably includes high-boiling hydrocarbon solvents such as those having a boiling point of from 100° to 250° C., e.g., dodecane, tridecane, etc. Since this reaction is a dehydrating reaction and is susceptible to influences of water, hydrocarbon solvents having poor water solubility are preferred. In the case of using the hydrocarbon solvents, the compounds of formula (II) can be obtained in high yield with reduced incorporation of impurities so that they can be purified easily without using time-consuming means, such as column chromatography.

The copper catalyst to be used includes a copper powder, $Cu_2O$, CuI, CuO, copper bronze, phosphor bronze, etc., and is preferably added in an amount of from 0.1 to 2 moles per mole of the benzidine derivative of formula (VI). The alkali to be used includes KOH, K₂CO₃, NaH, NaOH, Na₂CO₃, KH, CaH₂, etc. The alkali is generally added in an amount of 4 moles or more, preferably from 4 to 50 moles, and more preferably from 6 to 20 moles, per mole of the benzidine derivative. The condensation reaction is usually carried out at a temperature ranging from 100° to 250° C. and preferably from 150° to 230° C.

The halogenated benzene derivative of formula (V) is used in an amount of at least 4 moles, preferably from 4 to about 20 moles, per mole of the benzidine derivative of formula (VI).

After completion of the reaction, water is added to the reaction mixture, and the product is extracted with a solvent which is capable of dissolving the product and is insoluble in water (e.g., methylene chloride, chloroform, an ether, toluene, etc.). The extract is treated with activated clay and then recrystallized from an appropriate solvent (e.g., acetone, ethyl acetate, an alcohol, hexane, toluene, methylene chloride, a mixture of the aforesaid solvents, chloroform, etc.). It is also possible to isolate the product in the course of the reaction. For example, the reaction is once suspended, and after the desired product is recovered by extracting with a solvent, etc., the reaction may be continued by replenishing the system with fresh catalyst, alkali, and starting compounds. In this case, a deactivated catalyst or alkali can be removed in the course of the reaction, and the overall reaction time can be shortened.

SYNTHESIS EXAMPLE 1

Preparation of N,N,N',N'-Tetrakis-(4-methylphenyl)-3,3'-dimethylbenzidine

In a round flask were charged 3.14 g (13.8 mmol) of o-tolidine, 40 g of potassium hydroxide, 400 mg of copper iodide, and 30 ml of n-dodecane, and the mixture was heated at 180° C. in a nitrogen stream. To the mixture was added dropwise 24.0 g (110 mmol) of 4-iodotoluene, and the heating at 180° C. was continued for 5 hours. Water was added to the reaction mixture, and the mixture was extracted with toluene. In order to assure completion of the reaction, the solvent was once removed by distillation, and 40 g of potassium hydroxide, 400 mg of copper iodide, and 24.0 g (110 mmol) of 4-iodotoluene were added to the residue, followed by allowing to react at 180° C. for 5 hours in a nitrogen stream. Water was added, and the mixture was extracted with toluene. The extract was dried over sodium sulfate and then treated with activated clay. The solvent was removed by distillation to obtain 5.98 g (yield: 75.7%) of N,N,N',N'-tetrakis-(4-methylphenyl)-3,3'-dimethylbenzidine, which was recrystallized from a mixed solvent of toluene/acetone/hexane to obtain 4.32 g (final yield: 54.7%) of a white crystal having a melting point of 174°-175° C. Analysis by high performance liquid chromatography revealed that the product has a high purity of 99.9%.

SYNTHESIS EXAMPLE 2

Preparation of N,N,N',N'-Tetraphenyl-3,3'-dimethylbenzidine

In a round flask were charged 4.25 g (20.0 mmol) of o-tolidine, 50 g of potassium hydroxide, 500 mg of copper iodide, and 30 ml of n-dodecane, and the mixture was heated at 180° C. in a nitrogen stream. To the mixture was added dropwise 24.48 g (120 mmol) of iodobenzene, followed by allowing the mixture to react at 180° C. for 6 hours. Water was added thereto, and the mixture was extracted with toluene. The extract was dried over sodium sulfate and treated with activated carbon. The solvent was removed by distillation to obtain 6.30 g (yield: 60.9%) of N,N,N',N'-tetraphenyl-3,3'-dimethylbenzidine. Recrystallization from a mixed solvent of benzene/n-hexane gave 4.79 g (final yield: 46.3%) of a white crystal having a melting point of 175°-178° C.

Since the benzidine compound has no film-forming property, they are used in combination with film-forming binder resins, such as acrylic resins, methacrylic resins, polystyrene, polyester, polyarylates, polysulfone, and polycarbonate.

The charge transport layer may further contain additives, such as plasticizers and leveling agents.

The charge transport layer can be formed by dissolving the benzidine compound of formula (II) and the binder resin in a solvent capable of dissolving both and coating the solution on a charge generating layer or an electrically conductive support. The content of the charge transport material in the charge transport layer generally ranges from 10 to 90% by weight, and preferably from 30 to 70% by weight.

The charge transport layer is formed so as to have a thickness larger than that of a charge generating layer, usually ranging from 5 to 50 μm, and preferably from 15 to 30 μm.

The electrically conductive support which can be used in this invention includes metal sheets, paper having been rendered conductive, high-molecular films or glass plates having a conductive layer thereon, and the like.

A protective layer which may be provided, if desired, comprises a resin having dispersed therein a metal oxide or a resin having dispersed therein an electron accepting compound.

An intermediate layer which may be provided, if desired, serves as a barrier layer or an adhesive layer and comprises a metal oxide (e.g., aluminum oxide), an acrylic resin, a phenolic resin, a polyester resin, a polyurethane resin, etc.

Sensitivity of electrophotographic photoreceptors is determined by various factors including charge generating capability of a charge generating material, efficiency of charge injection from a charge generating layer to a charge transport layer, charge transfer efficiency of a charge transport material, and the like. A photoreceptor having satisfactory sensitivity would not be obtained unless any one of these performance requirement is met. For example, if wrong choice of a charge transport material is made, the resulting photoreceptor is inferior in charge injection efficiency and charge transport efficiency which result in inferior photoresponse properties, even when a charge generating material having a high charge generating function is used therewith. As a result, the resulting photoreceptor exhibits low absolute sensitivity. To the contrary, even with a charge transport material having a high charge transport efficiency, photoresponse properties of the resulting photoreceptor turn out inferior in some cases depending on the choice of a charge generating material. Accordingly, the combination of the aforesaid bisazo compound and benzidine compound is of great importance in the present invention.

Whether the photoreceptor of the present invention properly functions in charge injection and transfer can be judged through measurement of an exposure necessary to reduce the surface potential to one-fifth the initial level after charging ($E_{1/5}$; unit: lux.sec) because $E_{1/5}$ depends chiefly on the aforesaid charge injection and transport efficiencies.

The present invention will now be illustrated in greater detail by way of the following examples, but it should be understood that the present invention is not limited thereto. In these examples, all the parts are by weight unless otherwise indicated.

EXAMPLE 1

One part of a polyvinyl butyral resin ("BLX" produced by Sekisui Chemical Co., Ltd.) was dissolved in 40 parts of cyclohexanone, and 3 parts of Compound No. I-1 (charge generating material) was added to the solution. The mixture was well dispersed in a paint shaker, and the resulting dispersion was coated on an aluminum sheet by means of an applicator, followed by drying to form a charge generating layer having a dry thickness of 0.2 μm.

A uniform solution consisting of 1 part of Compound No. II-5 (charge transport material), 1 part of a polycarbonate resin ("Lexane 145" produced by General Electric Co., Ltd.; molecular weight: 35,000–40,000), and 15 parts of dichloromethane was coated on the charge generating layer, followed by drying to form a charge transport layer having a dry thickness of 20 μm.

The resulting photoreceptor was evaluated for performance as follows by the use of an electrostatic copying paper tester ("SP-428" manufactured by Kawaguchi Denki Seisakusho). The photoreceptor was negatively charged to $-6$ KV by corona discharge and, after allowing to stand in a dark place for 2 seconds, a surface potential $V_{po}$ (V) was measured. Then, the photoreceptor was exposed to light of a tungsten lamp at an illumination of 5 lux, and a time required for decreasing the surface potential to one-fifth the initial one ($V_{po}$) was measured to calculate an exposure $E_{1/5}$ (lux.sec). As a result, $V_{po}$ was $-980$ V, and $E_{1/5}$ was 6.5 lux.sec.

EXAMPLES 2 to 20

An electrophotographic photoreceptor was produced in the same manner as in Example 1, except for changing the charge generating material and the charge transporting material as shown in Table 1. The results of performance evaluation on the resulting photoreceptors are shown in Table 1.

TABLE 1

| Example No. | Charge Generating Material (I) | Charge Transporting Material (II) | $V_{po}$ (V) | $E_{1/5}$ (lux · sec) |
|---|---|---|---|---|
| 2 | I-1 | II-23 | −1005 | 6.3 |
| 3 | " | II-41 | −980 | 6.4 |
| 4 | " | II-56 | −975 | 6.4 |
| 5 | I-2 | II-5 | −1000 | 3.2 |
| 6 | " | II-23 | −895 | 3.0 |
| 7 | " | II-41 | −905 | 3.2 |
| 8 | I-15 | II-5 | −930 | 2.3 |
| 9 | " | II-23 | −925 | 2.3 |
| 10 | " | II-41 | −970 | 2.5 |
| 11 | I-41 | II-5 | −1005 | 6.3 |
| 12 | " | II-23 | −980 | 6.1 |
| 13 | " | II-41 | −925 | 6.1 |
| 14 | " | II-56 | −950 | 6.3 |
| 15 | I-42 | II-5 | −870 | 3.0 |
| 16 | " | II-23 | −875 | 3.2 |
| 17 | " | II-41 | −1010 | 3.3 |
| 18 | I-55 | II-5 | −920 | 2.0 |
| 19 | " | II-23 | −950 | 2.0 |
| 20 | " | II-41 | −855 | 1.9 |

COMPARATIVE EXAMPLE 1

An electrophotographic photoreceptor was produced in the same manner as in Example 1, except for replacing the charge transporting material with a compound of formula:

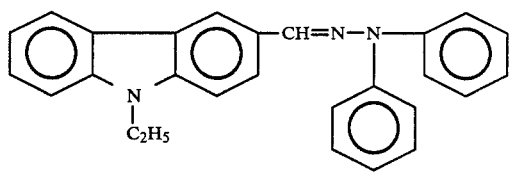

COMPARATIVE EXAMPLE 2

An electrophotographic photoreceptor was produced in the same manner as in Example 1, except for replacing the charge transporting material with a compound of formula:

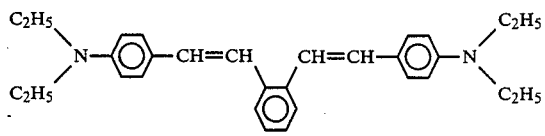

COMPARATIVE EXAMPLE 3

An electrophotographic photoreceptor was produced in the same manner as in Example 1, except for replacing the charge transporting material with a compound of formula:

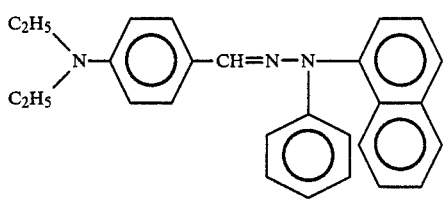

COMPARATIVE EXAMPLE 4

An electrophotographic photoreceptor was produced in the same manner as in Example 1, except for replacing the charge generating material with a compound of formula:

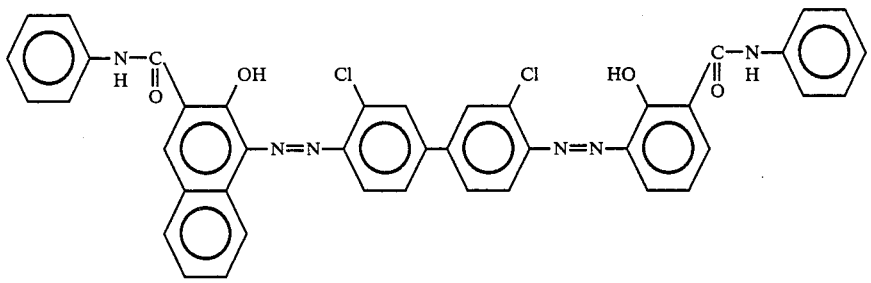

COMPARATIVE EXAMPLE 5

An electrophotographic photoreceptor was produced in the same manner as in Example 1, except for replacing the charge transporting material with a compound of formula:

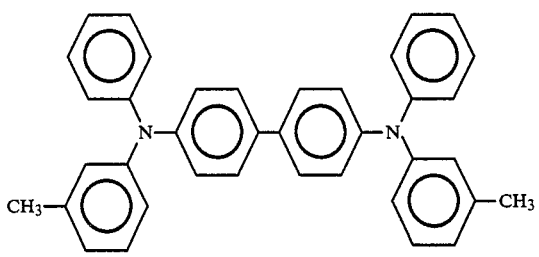

COMPARATIVE EXAMPLES 6 to 9

Electrophotographic photoreceptors were produced in the same manner as in Comparative Examples 1 to 3 and 5, except for replacing the charge generating material I-1 with Compound No. I-41.

Each of the photoreceptors obtained in Comparative Examples 1 to 9 was evaluated in the same manner as in Example 1. The results obtained are shown in Table 2 below.

TABLE 2

| Comparative Example No. | $V_{po}$ (V) | $E_{1/5}$ (lux · sec) |
|---|---|---|
| 1 | −815 | 8.8 |
| 2 | −780 | 8.9 |
| 3 | −800 | 9.2 |
| 4 | −925 | 8.5 |
| 5 | −810 | 6.7 |
| 6 | −830 | 8.5 |
| 7 | −870 | 8.7 |
| 8 | −755 | 9.0 |
| 9 | −850 | 6.5 |

As is apparent from the results of Tables 1 and 2, the electrophotographic photoreceptors according to the present invention using a combination of the bisazo compound of formula (I) and the benzidine compound of formula (II) exhibit high photoresponse properties even in a weak electric field and high sensitivity in a visible light region.

While the invention has been described in detail and with reference to specific embodiments thereof, it will be apparent to one skilled in the art that various changes and modifications can be made therein without departing from the spirit and scope thereof.

What is claimed is:

1. An electrophotographic photoreceptor comprising an electrically conductive support having provided thereon a photosensitive layer composed of a charge generating layer and a charge transport layer, wherein said charge generating layer contains a bisazo compound represented by formula (I)

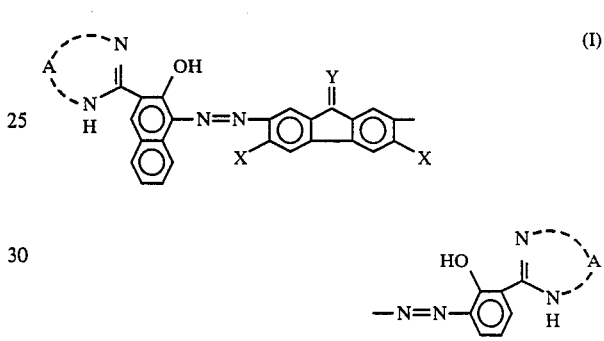

wherein X represents a hydrogen atom, a halogen atom or a nitro group, Y represents $$=C\diagup_{CN}^{CN}$$

or =O, and A represents a divalent aromatic hydrocarbon group or a divalent heterocyclic group containing at least one nitrogen atom; and said charge transport layer contains a benzidine compound represented by formula (II)

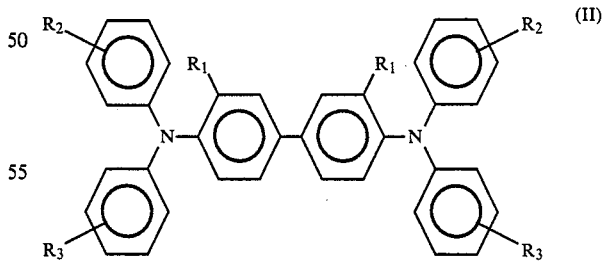

wherein $R_1$ represents an alkyl group or an alkoxy group, and $R_2$ and $R_3$ each represents a hydrogen atom, an alkyl group, an alkoxy group, a halogen atom, an alkoxycarbonyl group or a substituted amino group.

2. An electrophotographic photoreceptor as claimed in claim 1, wherein said charge generating layer further contains a binder resin.

3. An electrophotographic photoreceptor as claimed in claim 2, wherein said bisazo compound is present in an amount of from 10 to 90% by weight based on the charge generating layer.

4. An electrophotographic photoreceptor as claimed in claim 1, wherein said charge generating layer has a thickness of from 0.05 to 3 μm.

5. An electrophotographic photoreceptor as claimed in claim 1, wherein said charge transport layer further contains a binder resin.

6. An electrophotographic photoreceptor as claimed in claim 5, wherein said benzidine compound is present in an amount of from 10 to 90% by weight based on the charge transport layer.

7. An electrophotographic photoreceptor as claimed in claim 1, wherein said charge transport layer has a thickness of from 5 to 50 μm.

8. An electrophotographic photoreceptor as claimed in claim 1, wherein said Y in formula (I) is

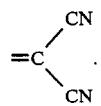

9. An electrophotographic photoreceptor as claimed in claim 1, wherein said Y in formula (I) is =O.

* * * * *